United States Patent
Miyazaki

(10) Patent No.: US 10,851,729 B2
(45) Date of Patent: Dec. 1, 2020

(54) DETERMINATION CRITERION FOR ENGINE TORQUE CONTROL DEVICE AND METHOD

(71) Applicant: TOYOTA JIDOSHA KABUSHIKI KAISHA, Toyota (JP)

(72) Inventor: Tsutomu Miyazaki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/183,284

(22) Filed: Jun. 15, 2016

(65) Prior Publication Data

US 2017/0002753 A1   Jan. 5, 2017

(30) Foreign Application Priority Data

Jun. 30, 2015   (JP) ................................. 2015-131598

(51) Int. Cl.
| | |
|---|---|
| *F02D 41/22* | (2006.01) |
| *F02D 11/10* | (2006.01) |
| *F02D 41/00* | (2006.01) |
| *F02D 41/10* | (2006.01) |

(52) U.S. Cl.
CPC ............ *F02D 41/22* (2013.01); *F02D 11/107* (2013.01); *F02D 41/0002* (2013.01); *F02D 41/10* (2013.01); *F02D 2041/227* (2013.01); *F02D 2200/1002* (2013.01); *F02D 2200/602* (2013.01); *F02D 2250/18* (2013.01); *Y02T 10/40* (2013.01)

(58) Field of Classification Search
CPC .... F02D 41/22; F02D 11/107; F02D 2250/18; F02D 2200/602; F02D 2200/1002; F02D 41/0002; F02D 41/10; F02D 2041/227; Y02T 10/40
See application file for complete search history.

(56) References Cited

U.S. PATENT DOCUMENTS

| | | | | |
|---|---|---|---|---|
| 5,109,695 | A * | 5/1992 | James ..................... | G01M 15/11 73/114.05 |
| 6,251,044 | B1 * | 6/2001 | Streib ................... | F02D 11/105 123/350 |
| 6,308,796 | B1 * | 10/2001 | Fuchs ....................... | B60T 7/12 180/169 |
| 6,964,192 | B2 * | 11/2005 | Bauer ................... | F02D 11/107 73/114.15 |
| 7,527,112 | B2 * | 5/2009 | Aoyagi .............. | B60H 1/00392 180/65.265 |

(Continued)

FOREIGN PATENT DOCUMENTS

| | | |
|---|---|---|
| CN | 202163321 U | 3/2012 |
| CN | 202441496 U | 9/2012 |

(Continued)

*Primary Examiner* — David Hamaoui
(74) *Attorney, Agent, or Firm* — Oblon, McClelland, Maier & Neustadt, L.L.P.

(57) ABSTRACT

Determination criteria for an excessive torque state are changed based on a predetermined vehicle speed related parameter. The determination criteria are changed such that when the vehicle speed related parameter is a value corresponding to a relatively high vehicle speed state, the excessive torque state is difficult to determine compared to when the vehicle speed related parameter is a value corresponding to a relatively low vehicle speed state.

7 Claims, 7 Drawing Sheets

(56) References Cited

U.S. PATENT DOCUMENTS

| | | | | |
|---|---|---|---|---|
| 8,577,584 B2* | 11/2013 | Gwinner | ................ | F02D 41/22 |
| | | | | 123/399 |
| 9,303,568 B2* | 4/2016 | Funakoshi | .............. | F02D 29/02 |
| 9,382,867 B2* | 7/2016 | Ando | ...................... | F02D 41/22 |
| 9,815,448 B2* | 11/2017 | Seel | ...................... | B60W 10/06 |
| 2003/0212483 A1* | 11/2003 | Folke | .................... | B60K 31/04 |
| | | | | 701/93 |
| 2008/0125929 A1* | 5/2008 | Prokhorov | ............ | F02D 41/009 |
| | | | | 701/31.4 |
| 2009/0167227 A1* | 7/2009 | Gwinner | ................ | F02D 41/22 |
| | | | | 318/434 |
| 2013/0030675 A1* | 1/2013 | Minase | ........... | B60W 30/18027 |
| | | | | 701/110 |
| 2017/0002758 A1* | 1/2017 | Nishimura | .......... | G01M 15/042 |
| 2017/0298854 A1* | 10/2017 | Kato | ...................... | F02D 11/02 |

FOREIGN PATENT DOCUMENTS

| | | |
|---|---|---|
| CN | 202789132 U | 3/2013 |
| DE | 199 33 793 A1 | 1/2000 |
| DE | 100 34 871 C1 | 2/2002 |
| JP | 2006-118432 | 5/2006 |
| JP | 2008-151118 | 7/2008 |
| JP | 2009-127549 | 6/2009 |

\* cited by examiner

DETERMINATION CRITERION FOR ENGINE TORQUE CONTROL DEVICE AND METHOD

INCORPORATION BY REFERENCE

The disclosure of Japanese Patent Application No. 2015-131598 filed on Jun. 30, 2015 including the specification, drawings and abstract is incorporated herein by reference in its entirety.

BACKGROUND

1. Technical Field

The disclosure relates to an engine control device and an engine control method that control an engine mounted on a vehicle according to a required torque. In particular, the disclosure relates to a technique that determines a state in which an engine torque is excessive relative to a required torque, thereby dealing with it properly.

2. Description of Related Art

An engine mounted on a vehicle is controlled along with a transmission. A required torque for the engine is the torque that can achieve a torque required for the vehicle by a driver. An engine control device controls the intake air amount, the fuel injection amount, and so on so that the engine outputs the required torque described above. However, there are cases where an engine torque greater than the required torque is output from the engine. The output of the engine torque greater than the required torque is produced due to, for example, accumulation of errors typified by electrical noise, malfunction of control calculation, or degradation of a sensor or an actuator.

In an engine control device described in Japanese Patent Application Publication No. 2008-151118 (JP 2008-151118 A), a required torque for an engine is obtained based on a predetermined engine control input value such as a throttle opening degree, while an engine torque is obtained based on a signal from a torque sensor. This engine control device is configured to determine whether or not the engine torque is excessive relative to the required torque by a predetermined value. Then, if the excessive torque state is determined, alarming, engine output restriction, or the like is performed as a fail-safe process.

SUMMARY

If such a determination on the excessive torque state is attempted to be made based on a uniform standard, it is difficult to properly set the standard. That is, if the standard of the determination is made strict, the excessive torque state is difficult to determine and therefore there is a possibility that the start of a fail-safe process is delayed, resulting in a reduction in the effect of the fail-safe process. On the other hand, if the standard of the determination is made loose, there is a possibility that a fail-safe process is performed even in the case where a driver does not feel excessive acceleration, thus giving a sense of incongruity to the driver.

The disclosure provides an engine control device and an engine control method that properly make a determination of an excessive torque state. By the proper determination of the excessive torque state according to the disclosure: it is possible not to give a sense of incongruity to a driver as much as possible; it is possible to suitably perform a fail-safe process; and it is possible to stably obtain the effect of the fail-safe process.

In the disclosure, in the state where the inter-vehicle distance to a preceding vehicle is considered to be large, such as, for example, when the travel speed of a vehicle (vehicle speed) is high, it is configured that the excessive torque state is difficult to determine. This is because when the inter-vehicle distance to the preceding vehicle is large, even if an excess of an engine torque over a required torque is large, the safety is hardly impaired. Further, this is because when the inter-vehicle distance to the preceding vehicle is large, the driver hardly feels excessive acceleration.

According to one aspect of the disclosure, an engine control device for a vehicle is provided. The vehicle includes an engine mounted on the vehicle. The engine control device includes an electronic control unit configured to: obtain a required torque for the engine; and obtain an engine torque; determine whether the engine is in an excessive torque state. The excessive torque state is a state in which the engine torque is higher than the required torque by at least a predetermined degree. The electronic control unit is also configure to: perform a fail-safe process when the engine is determined to be in the excessive torque state; set a determination criterion for determining the excessive torque state, based on a predetermined vehicle speed related parameter; and set the determination criterion such that when a value of the vehicle speed related parameter is a value corresponding to a relatively high vehicle speed, the engine is less prone to be determined to be in the excessive torque state compared to when the value of the vehicle speed related parameter is a value corresponding to a relatively low vehicle speed.

The vehicle speed related parameter may be arbitrarily selected from various parameters related to a vehicle speed or a change in vehicle speed. The vehicle speed related parameter is not limited to a single parameter and may be a combination of two or more parameters.

According to the disclosure, the determination criterion for the excessive torque state is changed based on the vehicle speed related parameter such that the excessive torque state is difficult to determine when the vehicle speed is relatively high compared to when the vehicle speed is relatively low. That is, when the vehicle speed is relatively high and the inter-vehicle distance to a preceding vehicle is large, even if the engine torque becomes excessive, the safety is hardly impaired and a driver hardly feels excessive acceleration. Therefore, in this case, by making it difficult to determine the excessive torque state, the start of a fail-safe process is suppressed so that it is possible not to give a sense of incongruity to the driver. On the other hand, when the vehicle speed is relatively low and the inter-vehicle distance to a preceding vehicle is not so large, the excessive torque state is made to be easily determined so that it is possible to start the fail-safe process promptly.

A detection system for the accelerator operation amount is basically of a simple configuration so that malfunction hardly occurs and, further, since a plurality of detection systems are normally provided, even if malfunction occurs in one of the detection systems, erroneous detection hardly occurs. When the accelerator operation amount is large, it is considered that not only the vehicle speed is high, but also the driver intends to accelerate the vehicle, and thus, also in this case, it is considered that the inter-vehicle distance to a preceding vehicle is large.

According to an aspect of the present disclosure, the vehicle speed related parameter may be an accelerator operation amount. Further, the electronic control unit may be configured to set the determination criterion such that when the accelerator operation amount is relatively large, the engine is less prone to be determined to be in the excessive torque state compared to when the accelerator operation amount is relatively small.

According to an aspect of the present disclosure, the determination criterion for the excessive torque state may include a first threshold value about a continuing time of a state in which the engine torque is excessive relative to the required torque. The electronic control unit may be configured to set the first threshold value to be greater when the vehicle speed related parameter is the value indicating the relatively high vehicle speed compared to when the vehicle speed related parameter is the value indicating the relatively low vehicle speed. This is because even if the engine torque becomes excessive relative to the required torque, the fail-safe process is not required at once, while, instead, the fail-safe process is required for the first time when a state in which the engine torque is excessive continues for a certain time.

When the vehicle speed is relatively high and the inter-vehicle distance to the preceding vehicle is large as described above, the time for which the engine torque excessive state is allowed becomes longer. Therefore, the electronic control unit may set the first threshold value about the continuing time to be greater when the vehicle speed related parameter is the value indicating the relatively high vehicle speed state compared to when the vehicle speed related parameter is the value indicating the relatively low vehicle speed state.

According to an aspect of the present disclosure, the determination criterion for the excessive torque state may include a second threshold value about an excess of the engine torque relative to the required torque. The electronic control unit may be configured to set the second threshold value to be greater when the vehicle speed related parameter is the value indicating the relatively high vehicle speed compared to when the vehicle speed related parameter is the value indicating the relatively low vehicle speed. This is because even if the engine torque becomes slightly excessive relative to the required torque, the fail-safe process is not required at once, while, instead, the fail-safe process is required for the first time when an excess of the engine torque becomes somewhat large.

When the vehicle speed is relatively high and the inter-vehicle distance to the preceding vehicle is large as described above, an allowed excess of the engine torque becomes greater. Therefore, the electronic control unit may set the second threshold value about the excess of the engine torque to be greater when the vehicle speed related parameter is the value indicating the relatively high vehicle speed state compared to when the vehicle speed related parameter is the value indicating the relatively low vehicle speed state.

Further, the determination criterion for the excessive torque state may include both a torque threshold value (second threshold value) being a threshold value about an excess of the engine torque relative to the required torque and a time threshold value (first threshold value) being a threshold value about a continuing time of a state in which the engine torque is excessive relative to the required torque. The electronic control unit may be configured to determine it to be an excessive torque state when a state in which an excess of the engine torque relative to the required torque is greater than or equal to the torque threshold value (second threshold value) continues for the time threshold value (first threshold value) or more.

With this configuration, the excessive torque state can be more properly determined by the electronic control unit. In this case, the electronic control unit may be configured to perform at least one of changing the torque threshold value (second threshold value) to a greater numerical value and changing the time threshold value (first threshold value) to a greater numerical value, i.e. a longer time, when the vehicle speed related parameter is a value indicating a relatively high vehicle speed state compared to when the vehicle speed related parameter is a value indicating a relatively low vehicle speed state.

Another aspect of the present disclosure relates to an engine control method for a vehicle which includes an engine mounted on the vehicle and an electronic control unit. The engine control method includes: obtaining a required torque for the engine; obtaining an engine torque; and determining whether the engine is in an excessive torque state. The excessive torque state is a state in which the engine torque is greater than the required torque by at least a predetermined degree. The engine control method also includes performing a fail-safe process when the engine is determined to be in the excessive torque state; setting a determination criterion for determining the excessive torque state, based on a predetermined vehicle speed related parameter; and setting the determination criterion such that when a value of the vehicle speed related parameter is a value corresponding to a relatively high vehicle speed, the engine is less prone to be determined to be in the excessive torque state compared to when the value of the vehicle speed related parameter is a value corresponding to a relatively low vehicle speed.

According to an aspect of the present disclosure, the determination criterion for the excessive torque state may include a first threshold value about a continuing time of a state in which the engine torque is excessive relative to the required torque. Further, the engine control method may further include setting the first threshold value to be greater when the vehicle speed related parameter is the value indicating the relatively high vehicle speed compared to when the vehicle speed related parameter is the value indicating the relatively low vehicle speed.

According to an aspect of the present disclosure, the determination criterion for the excessive torque state may include a second threshold value about an excess of the engine torque relative to the required torque. Further, the engine control method may further include setting the second threshold value to be greater when the vehicle speed related parameter is the value indicating the relatively high vehicle speed compared to when the vehicle speed related parameter is the value indicating the relatively low vehicle speed.

According to the engine control device of the disclosure, the determination criterion for an excessive torque state is changed based on a predetermined vehicle speed related parameter and the excessive torque state is difficult to determine in the state where the vehicle speed is relatively high so that the inter-vehicle distance to a preceding vehicle is considered to be large. Therefore, while suppressing giving a sense of incongruity to a driver, a fail-safe process is performed as needed so that it is possible to obtain the effect thereof.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinbelow, an embodiment of the disclosure will be described with reference to the drawings. In this embodiment, a description will be given of a case where the disclosure is applied by way of example to a control device for a gasoline engine mounted on a vehicle, but the disclosure is not limited thereto and may alternatively be applied to a control device for a diesel engine, a gas engine, or an engine that uses alcohol fuel.

Figure 1:
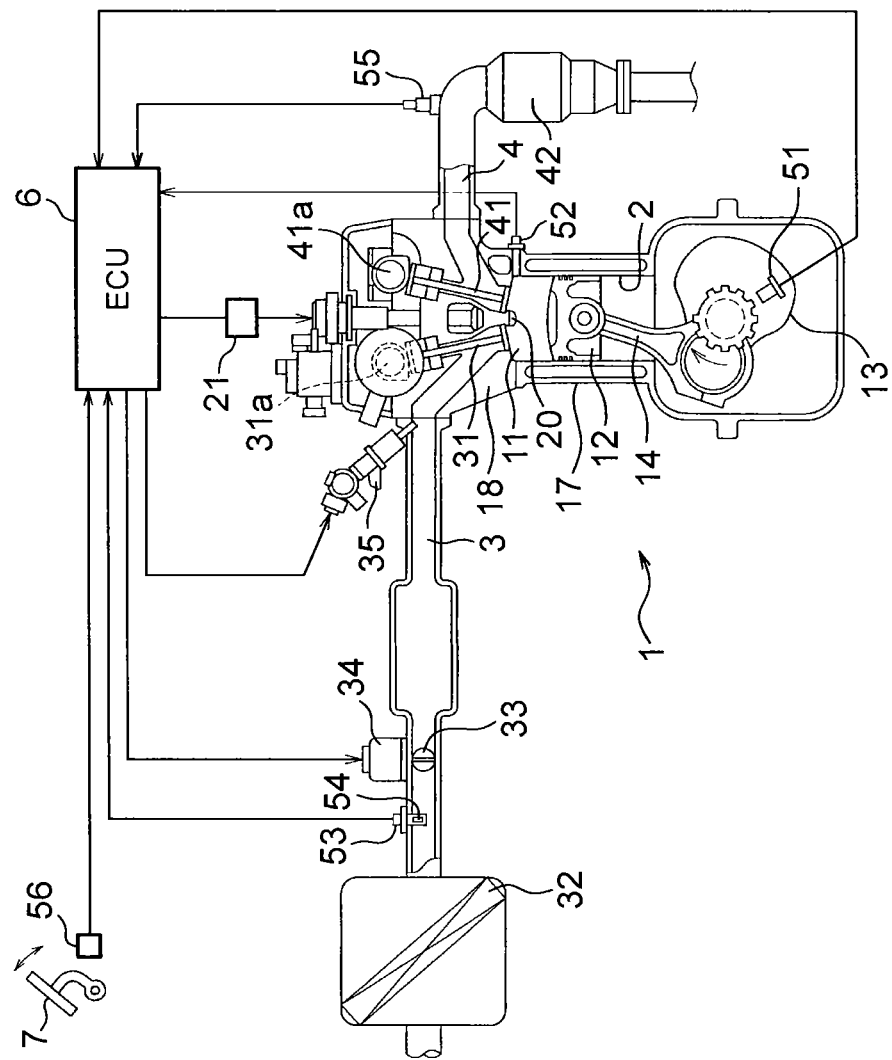
FIG. 1 is a diagram exemplarily showing the configuration of an engine and its control device.

FIG. 1 shows a schematic configuration of an engine 1 according to this embodiment. The engine 1 in this example is a multi-cylinder gasoline engine, wherein a piston 12 is disposed in each of cylinders 2 to define a combustion chamber 11 therein. The pistons 12 are connected to a crankshaft 13 by connecting rods 14. A crank angle sensor 51 that detects a rotation angle of the crankshaft 13 (crank angle) is disposed in the lower part of a cylinder block 17.

On the other hand, a cylinder head 18 is fastened to an upper end of the cylinder block 17 to close upper ends of the cylinders 2. In the cylinder head 18, a spark plug 20 is disposed to face the inside of each cylinder 2 and is configured to generate a spark discharge in response to supply of electric power from an igniter 21 controlled by a later-described ECU 6. A water temperature sensor 52 that detects a cooling water temperature of the engine 1 is disposed at an upper portion of a side wall of the cylinder block 17.

In the cylinder head 18, an intake passage 3 and an exhaust passage 4 are formed to communicate with the combustion chambers 11 of the cylinders 2. An intake valve 31 is disposed at a downstream end of the intake passage 3 (downstream end of the intake air flow) facing each combustion chamber 11 and, likewise, an exhaust valve 41 is disposed at an upstream end of the exhaust passage 4 (upstream end of the exhaust gas flow) facing each combustion chamber 11. A valve system for operating the intake valves 31 and the exhaust valves 41 is provided in the cylinder head 18.

By way of example, the valve system of this embodiment includes an intake camshaft 31a and an exhaust camshaft 41a that respectively actuate the intake valves 31 and the exhaust valves 41. These camshafts 31a and 41a are driven by the crankshaft 13 through a timing chain (not shown) or the like so that the intake valves 31 and the exhaust valves 41 are opened and closed at predetermined timings.

An air cleaner 32, an air flow meter 53, an intake air temperature sensor 54 (incorporated in the air flow meter 53), and an electronically controlled throttle valve 33 are disposed in the intake passage 3. The throttle valve 33 is driven by a throttle motor 34 to throttle the flow of intake air, thereby adjusting the intake air amount of the engine 1. The opening degree of the throttle valve 33 (throttle opening degree) is controlled by the later-described ECU 6.

In the intake passage 3, an injector 35 for fuel injection is disposed for each cylinder 2 and controlled by the later-described ECU 6 to inject fuel into the intake passage 3. The fuel injected in this way is mixed with intake air, sucked into the cylinder 2, ignited by the spark plug 20, and burned. Burned gas thus generated flows out into the exhaust passage 4 and is purified with a catalyst 42. An air-fuel ratio sensor 55 is disposed on the upstream side of the catalyst 42.

Further, an accelerator pedal 7 configured for a depressing operation by a driver is provided in a vehicle compartment and an accelerator opening degree sensor 56 is disposed for detecting an operation amount of the accelerator pedal 7 (accelerator opening degree). Although details are not shown, the accelerator opening degree sensor 56 is configured such that two angle sensors each output a signal corresponding to an accelerator opening degree and thus that even if one of the angle sensors fails, the accelerator opening degree can be detected by the signal from the other angle sensor.

The ECU 6 is a known electronic control unit. The ECU 6 includes a CPU (Central Processing Unit), a ROM (Read Only Memory), a RAM (Random Access Memory), a backup RAM, and so on. None of the CPU, the ROM, the RAM, and the backup RAM are shown. The CPU executes various calculations based on control programs and maps stored in the ROM. The RAM temporarily stores calculation results from the CPU, data that are input from the sensors, and so on. The backup RAM stores, for example, data that should be stored at the stop of the engine 1.

Figure 2:
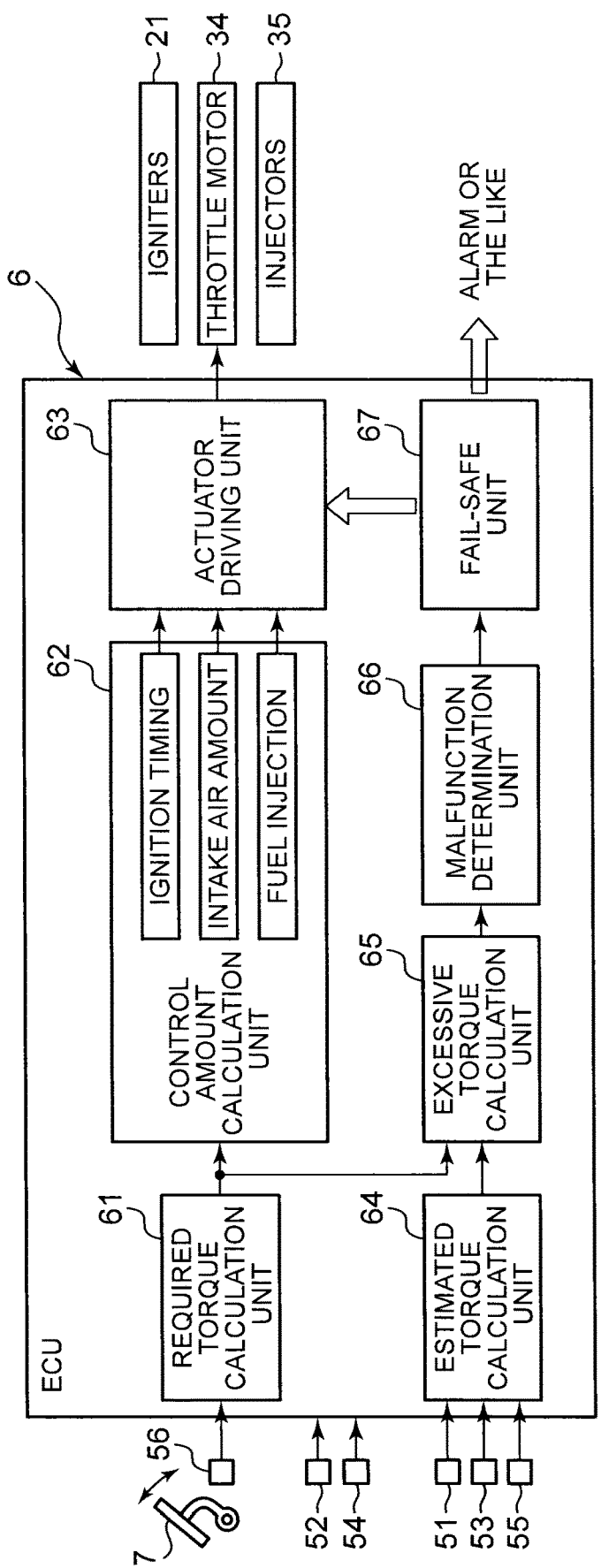
FIG. 2 is a functional block diagram showing the flow of processes according to control of the engine and torque monitoring.

As also shown in FIG. 2, the crank angle sensor 51, the water temperature sensor 52, the air flow meter 53, the intake air temperature sensor 54, the air-fuel ratio sensor 55, the accelerator opening degree sensor 56, and so on are connected to the ECU 6. The ECU 6 executes various control programs based on signals input from these various sensors and so on. By the execution of these control programs, the ECU 6 executes control of the ignition timing by the igniters 21, control of the throttle opening degree (i.e. control of the intake air amount) by the throttle motor 34, and control of the fuel injection by the injectors 35.

In this embodiment, the controls of the ignition timing, the intake air amount, and the fuel injection are executed so as to achieve a required torque for the engine 1. The required torque is a torque that can achieve a behavior required for the vehicle by the driver. The required torque is achieved by cooperative control of the engine 1 and a transmission. In this way, since the control is made to be based on a "torque" that is closely related to an operation feeling of the driver, it is possible to achieve an improvement in drivability.

Specifically, as exemplarily shown in the upper row of FIG. 2, the ECU 6 includes a required torque calculation unit 61 and a control amount calculation unit 62. The required torque calculation unit 61 calculates a required torque for the engine 1 in consideration of a reduction ratio in a power transmission system and losses in the engine 1 and the power transmission system. The control amount calculation unit 62 calculates control amounts such as an ignition timing, an intake air amount, and a fuel injection amount for achieving this required torque. Then, drive signals corresponding to these control amounts are output from an actuator driving unit 63 so as to be sent to the igniter 21, the throttle motor 34, and the injector 35, respectively. Herein, the required torque calculation unit 61, the control amount calculation unit 62, and the actuator driving unit 63 represent the functions of the ECU 6.

By way of example, the required torque calculation unit 61 includes a power train driver model and calculates a target driving force of the vehicle from an accelerator opening degree and a vehicle speed according to a map predetermined through experiments and simulations. Then, the required torque calculation unit 61 converts the target driving force to a required torque based on a reduction ratio of the power transmission system including the transmission, and so on. Herein, the power train driver model is a model formula that is used for setting a target driving force of the vehicle based on an operation of the driver. Since various specific methods are known as a method for conversion to a required torque, a description thereof is omitted herein.

The control amount calculation unit 62 first calculates a target torque by adding a reserve torque to the required torque and then calculates a load factor (intake air charging efficiency of the cylinder 2) for achieving the target torque. For example, load factors corresponding to target torques are preset through experiments and so on when the air-fuel ratio is a stoichiometric air-fuel ratio and the ignition timing is MBT, and are stored as a map in the ROM of the ECU 6. The control amount calculation unit 62 refers to this map and calculates a target load factor and, based on this load factor, the control amount calculation unit 62 calculates a control target value of a throttle opening degree using an inverse air model.

The control amount calculation unit 62 also calculates an ignition timing that is retarded from MBT so as to reduce an engine torque corresponding to the reserve torque. That is, a map in which the relationship between the engine torque and the ignition timing is preset through experiments and so on is also stored in the ROM of the ECU 6, and the control amount calculation unit 62 refers to this map and calculates a target ignition timing. Further, the control amount calculation unit 62 calculates an actual load factor from an intake air amount measured by the air flow meter 53 and an engine speed and calculates a fuel injection amount according to the actual load factor so as to achieve a stoichiometric air-fuel ratio. The engine speed is calculated based on a signal from the crank angle sensor 51.

Then, the actuator driving unit 63 produces a drive signal for the igniter 21 that achieves the ignition timing described above, a drive signal for the throttle motor 34 that achieves the throttle opening degree described above, and a drive signal for the injector 35 that achieves the fuel injection amount described above, and sends these signals to the igniter 21, the throttle motor 34, and the injector 35, respectively. Consequently, suitable controls of the ignition timing, the intake air amount, and the fuel injection are performed so that an engine torque that can achieve a behavior of the vehicle required by the driver is output while maintaining a desired air-fuel ratio.

On the other hand, as shown in the lower row of FIG. 2, the ECU 6, in parallel to the controls of the ignition timing, the intake air amount, the fuel injection amount, and so on, monitors whether or not these controls are performed normally so that a target engine torque is output (torque monitoring). That is, the ECU 6 includes an estimated torque calculation unit 64 that estimates a torque output from the engine 1 (engine torque), an excessive torque calculation unit 65 that calculates an excess (excessive torque Q) of the engine torque over the required torque, an malfunction determination unit 66 that determines an malfunctioning state in which the engine torque is excessive relative to the required torque by a predetermined degree or more (excessive torque state), and a fail-safe unit 67 that performs a fail-safe process in the excessive torque state. Herein, the estimated torque calculation unit 64, the excessive torque calculation unit 65, the malfunction determination unit 66, and the fail-safe unit 67 represent the functions of the ECU 6.

The estimated torque calculation unit 64 mainly estimates an actual engine torque based on an actual load factor that is calculated for the engine control as described above, an actual air-fuel ratio that is calculated based on a signal from the air-fuel ratio sensor 55, an ignition timing (control target value), and so on. Then, the excessive torque calculation unit 65 subtracts the required torque from the estimated engine torque to calculate an excessive torque Q. Then, the malfunction determination unit 66 determines an excessive torque state when a state in which the excessive torque Q is greater than or equal to a torque threshold value (Qth) continues for a time threshold value (Tth) or more, as will be described hereinbelow.

In this way, based not only on the magnitude of the excessive torque Q, but also on the continuing time of the state in which the engine torque is excessive, it is possible to properly determine an excessive torque state for which a fail-safe process is necessary. This is because even if the engine torque becomes slightly excessive relative to the required torque, the fail-safe process is not required at once, while, instead, the fail-safe process is required for the first time when a state in which the excessive torque Q is somewhat large continues for a predetermined time.

Hereinbelow, referring to FIGS. 3 to 6, details of a determination in the malfunction determination unit 66 will be described. These figures each show an image diagram of a map (threshold value map) in which torque threshold values (Qth) and time threshold values (Tth) as determination criteria are defined by using, as parameters, an excessive torque Q being an excess of an engine torque and a continuing time T of an engine torque excessive state. These threshold value maps are stored in the ROM of the ECU 6.

Figure 3:
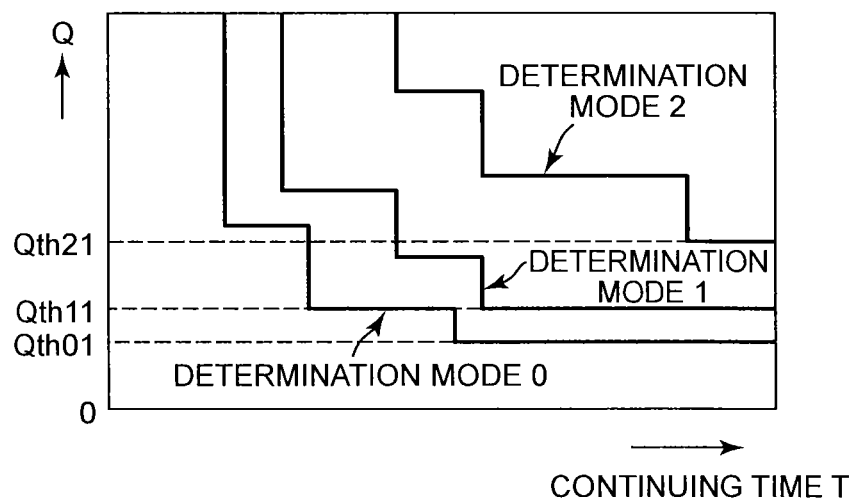
FIG. 3 is an image diagram showing one example of a threshold value map.

In this embodiment, as shown in FIG. 3, three determination modes having mutually different determination criteria basically according to a vehicle speed are set. That is, three determination modes of a determination mode 0 (vehicle speed <10 km/h), a determination mode 1 (10 km/h≤vehicle speed<30 km/h), and a determination mode 2 (vehicle speed ≥30 km/h) are set and one of the three determination modes is selected based on an accelerator opening degree as will be described later. The accelerator opening degree is one example of a parameter related to a vehicle speed.

Specifically, in the threshold value maps shown in FIGS. 3 to 6, the threshold values for each determination mode are set in consideration of an inter-vehicle distance to a preceding vehicle that is assumed corresponding to a vehicle speed. In general, it is considered that the higher the vehicle speed, the greater the inter-vehicle distance. When the inter-vehicle distance is large, even if the engine torque becomes excessive, the safety is hardly impaired. Further, when the vehicle speed is high and the inter-vehicle distance is large, it is considered that the driver hardly feels excessive acceleration. Therefore, the more the determination mode is on the high speed side, the greater values the torque threshold values (Qth) and the time threshold values (Tth) are set to.

Specifically, for example, a torque threshold value Qth11 of the determination mode 1 is greater than a torque threshold value Qth01 of the determination mode 0 and further a torque threshold value Qth21 of the determination mode 2 is even greater. Likewise, the more the determination mode is on the high speed side ([determination mode 0]→[determination mode 1]→[determination mode 2]), the greater values the time threshold values (Tth) are set to (the time becomes longer).

By setting the torque threshold values (Qth) and the time threshold values (Tth) in this way, in the state where the vehicle speed is relatively high so that the inter-vehicle distance to a preceding vehicle is considered to be large, an excessive torque state is difficult to determine so that the start of the fail-safe process is suppressed. On the other hand, in the state where the vehicle speed is relatively low so that the inter-vehicle distance to a preceding vehicle is considered not to be large, an excessive torque state is easily determined so that the fail-safe process is started promptly.

In the threshold value maps of FIGS. 3 to 6, three torque threshold values (Qth) and three time threshold values (Tth) are set for each determination mode. These torque threshold values (Qth) and time threshold values (Tth) in the threshold value maps are values that are adapted through experiments, simulations, and so on in consideration of an inter-vehicle distance assumed by a vehicle speed (inter-vehicle distance corresponding to an allowable vehicle acceleration).

Figure 4:
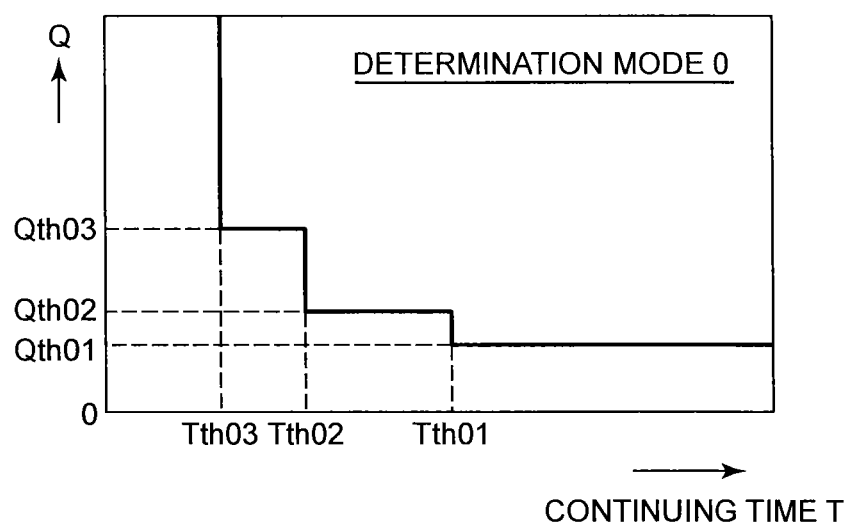
FIG. 4 is a diagram showing a threshold value map of a determination mode 0.

More specifically, in the determination mode 0 shown in FIG. 4, first, second, and third three torque threshold values Qth01, Qth02, and Qth03 mutually different from each other are set and the smallest first torque threshold value Qth01 (small torque threshold value) is a threshold value for determining that the engine torque is excessive. The greater second and third torque threshold values Qth02 (middle torque threshold value) and Qth03 (large torque threshold value) are threshold values each for determining the excessive degree of the engine torque (magnitude of the excessive torque Q).

On the other hand, in consideration that the greater the excessive torque Q, the more the driver tends to feel excessive acceleration and that the inter-vehicle distance is narrowed in a short time, thus leading to a possibility that the safety decreases, the greater the torque threshold value (Qth), the smaller value the time threshold value (Tth) is set to. That is, first, second, and third three time threshold values (long time threshold value Tth01>middle time threshold value Tth02>short time threshold value Tth03) are set respectively corresponding to the first, second, and third three torque threshold values Qth01, Qth02, and Qth03 (Qth01<Qth02<Qth03).

In the threshold value map of FIG. 4, for example, if a state in which the excessive torque Q is greater than and equal to the first torque threshold value Qth01 and less than the second torque threshold value Qth02 continues for the first time threshold value Tth01 or more, it can be determined as an excessive torque state. If a state in which the excessive torque Q is greater than and equal to the second torque threshold value Qth02 and less than the third torque threshold value Qth03 continues for the second time threshold value Tth02 or more, it can be determined as an excessive torque state. Alternatively, if a state in which the excessive torque Q is greater than and equal to the third torque threshold value Qth03 continues for the third time threshold value Tth03 or more, it can be determined as an excessive torque state.

That is, in this embodiment, a threshold value of an excess of an engine torque (torque threshold value) and a threshold value of a continuing time of an engine torque excessive state (time threshold value) are used as determination criteria for an excessive torque state and the time threshold value (Tth) is suitably changed according to the torque threshold value (Qth), i.e. the excessive degree of the engine torque.

Figure 5:
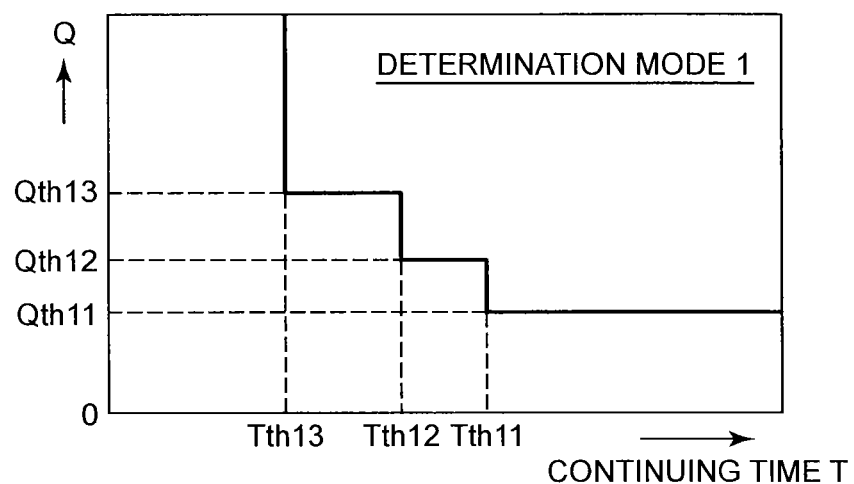
FIG. 5 is a diagram showing a threshold value map of a determination mode 1.

Likewise, in the threshold value map of the determination mode 1 shown in FIG. 5, although a detailed description will be omitted, three torque threshold values, i.e. a first torque threshold value Qth11, a second torque threshold value Qth12, and a third torque threshold value Qth13 (Qth11<Qth12<Qth13), and three time threshold values, i.e. a first time threshold value Tth11, a second time threshold value Tth12, and a third time threshold value Tth13 (Tth11>Tth12>Tth13), are set.

Figure 6:
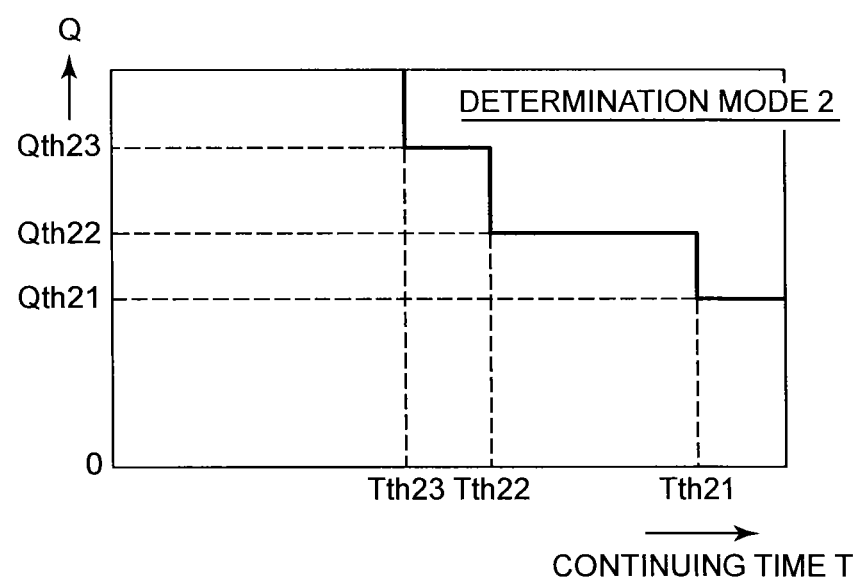
FIG. 6 is a diagram showing a threshold value map of a determination mode 2.

Likewise, in the threshold value map of the determination mode 2 shown in FIG. 6, three torque threshold values, i.e. a first torque threshold value Qth21, a second torque threshold value Qth22, and a third torque threshold value Qth23 (Qth21<Qth22<Qth23), and three time threshold values, i.e. a first time threshold value Tth21, a second time threshold value Tth22, and a third time threshold value Tth23 (Tth21>Tth22>Tth23), are set.

Between the three determination modes, there are relationships of [Qth01<Qth11<Qth21], [Qth02<Qth12<Qth22], and [Qth03<Qth13<Qth23] with respect to the torque threshold values (Qth) and there are relationships of [Tth01<Tth11<Tth21], [Tth02<Tth12<Tth22], and [Tth03<Tth13<Tth23] with respect to the time threshold values (Tth).

Next, a specific sequence of the determination processing of the excessive torque state described above will be described with reference to a flowchart of FIG. 7. A routine of this determination processing is repeatedly executed by the ECU 6 at a predetermined time interval (e.g. 16 ms).

Figure 7:
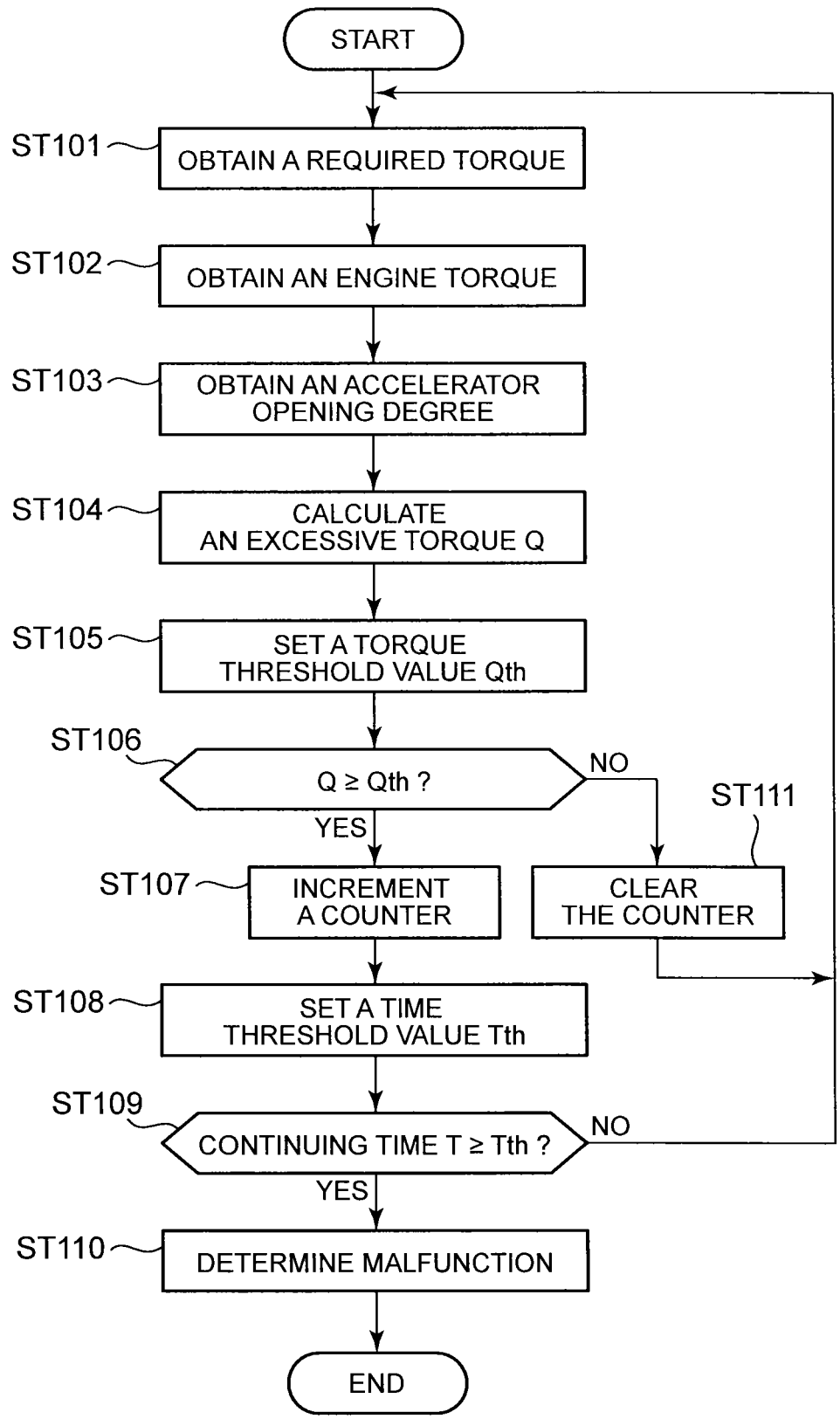
FIG. 7 is a flowchart showing the sequence of determination processing of an excessive torque state.

In the determination processing routine shown in FIG. 7, at step ST101 after the start, a required torque for the engine 1 is obtained and then, at step ST102, an engine torque is obtained. As described above with reference to FIG. 2, the required torque is calculated in the required torque calculation unit 61 of the ECU 6, while the engine torque is calculated in the estimated torque calculation unit 64 of the ECU 6. Then, at step ST103, an accelerator opening degree is obtained based on a signal from the accelerator opening degree sensor 56.

Then, at step ST104, an excessive torque Q is calculated by subtracting the required torque from the engine torque. This processing is performed in the excessive torque calculation unit 65 (see FIG. 2) of the ECU 6. When the engine torque is smaller than the required torque, a value of the excessive torque Q is set to zero (Q=0). Then, at step ST105, based on the accelerator opening degree, the torque threshold value (Qth) is set by referring to the threshold value maps of FIGS. 3 to 6.

That is, first, one of the three determination modes 0 to 2 is selected based on the accelerator opening degree. For example, if the accelerator opening degree is less than a first determination value α, the determination mode 0 is selected, while, if the accelerator opening degree is greater than or equal to the first determination value α and less than a second determination value β (β>α), the determination mode 1 is selected. Alternatively, if the accelerator opening degree is greater than or equal to the second determination value β, the determination mode 2 is selected.

The reason for selecting the determination mode based on the accelerator opening degree as described above is that there is a sufficient correlation between an accelerator opening degree and a vehicle speed. When the accelerator opening degree is large, it is considered that the vehicle speed is relatively high and that the inter-vehicle distance to a preceding vehicle is large. Further, when the accelerator opening degree is large, it may also be considered that the driver intends to accelerate the vehicle, and thus, also from this aspect, it is considered that the inter-vehicle distance is large.

Specifically, the first and second determination values α and β are each a minimum accelerator opening degree required for travelling on a flat road at a constant vehicle speed and are each an accelerator opening degree that enables steady running on a flat road at a predetermined vehicle speed (e.g. 10 km/h, 30 km/h) when the gear shift is in the first position. That is, it can be presumed that the vehicle speed is 10 km/h or more when "accelerator opening degree≥α", that the vehicle speed is 30 km/h or more when "accelerator opening degree≥β", and that the vehicle speed is less than 10 km/h when "accelerator opening degree<α".

The reason for setting the minimum accelerator opening degree required for the steady running at the predetermined vehicle speed to each of the first and second determination values α and β is for strictly performing a determination of a vehicle speed based on an accelerator opening degree. That is, assuming that the driver is depressing the accelerator pedal 7 for acceleration, the accelerator opening degree naturally becomes large compared to that during the steady running and, therefore, if the accelerator opening degree determination values α and β are set assuming the steady running, there is no possibility of an erroneous determination.

At step ST105, the first torque threshold value Qth11 in the determination mode selected according to the accelerator opening degree as described above (hereinbelow, a description will be given of the case of the determination mode 1 by way of example) is set as the torque threshold value (Qth) for determining an excessive torque state or not. Then, at step ST106, the first torque threshold value Qth11 and the excessive torque Q calculated at step ST104 are compared to each other. If the excessive torque Q is less than the first torque threshold value Qth11 (Q<Qth11), a negative determination (NO) is made and the routine proceeds to step ST111 which will be described later.

On the other hand, if the excessive torque Q is greater than or equal to the first torque threshold value Qth11 (Q≥Qth11), an affirmative determination (YES) of an excessive torque state is made and the routine proceeds to step ST107 where an excessive torque counter incorporated in the ECU 6 is incremented (+16). Then, at step ST108, the time threshold value (Tth) is set by referring to the threshold value map. The threshold value map selected in this case is the threshold value map selected based on the accelerator opening degree at step ST105. Hereinbelow, a description will be given of the case of the determination mode 1 as described above.

That is, in the case of the determination mode 1, as shown in the threshold value map of FIG. 5, if the excessive torque Q calculated at step ST104 is greater than or equal to the first torque threshold value Qth11 and less than the second torque threshold value Qth12, the first time threshold value Tth11 is set. If the excessive torque Q is greater than or equal to the second torque threshold value Qth12 and less than the third torque threshold value Qth13, the second time threshold value Tth12 is set. If the excessive torque Q is greater than or equal to the third torque threshold value Qth13, the third time threshold value Tth13 is set.

Then, at step ST109, it is determined whether or not a counter value of the excessive torque counter, i.e. a continuing time T of the engine torque excessive state (state of Q≥Qth11), is greater than or equal to the time threshold value (Tth11, Tth12, Tth13) set at step ST108. If the result of this determination is a negative determination (NO), the routine returns to step ST101 and repeats the sequence described above. In this way, the counter value of the excessive torque counter is incremented by 16 every time this processing routine is executed at a period of 16 ms.

When the counter value (continuing time T) thus incremented becomes greater than or equal to the time threshold value (Tth11, Tth12, Tth13), an affirmative determination (YES) is made at step ST109 and the routine proceeds to step ST110. In this case, it is determined that an excessive torque state is established and thus that there is malfunction in the torque control of the engine 1 (malfunction determination), and the processing is finished (END). In response to this malfunction determination, a fail-safe process is performed by the fail-safe unit 67 (see FIG. 2) of the ECU 6. Herein, the malfunction of the torque control of the engine 1 represents that there is malfunction in the controls of the ignition timing, the intake air amount, the fuel injection amount, and so on.

That is, if the state where the excessive torque Q is greater than or equal to the first torque threshold value Qth11 continues for the time threshold value (Tth11, Tth12, Tth13) or more, which is set based on the magnitude of the excessive torque Q, it is determined to be an malfunctioning state in which the engine torque is excessive relative to the required torque by a predetermined degree or more (excessive torque state), and a fail-safe process is performed.

On the other hand, if the excessive torque Q becomes less than the first torque threshold value Qth11 (Q<Qth11) before the lapse of a time corresponding to the time threshold value (Tth11, Tth12, Tth13) so that a negative determination (NO) is made at step ST106, the routine proceeds to step ST111 to clear the excessive torque counter and then returns to step ST101.

The processing at steps ST105 to ST111 of the flowchart of FIG. 7 is performed in the ECU 6. The function of the ECU 6 that performs this malfunction determination processing is created by the malfunction determination unit 66. As the fail-safe process, for example, preset control amounts may be sent to the actuator driving unit 63 to limit the controls of the throttle motor 34, the injectors 35, and so on, and at the same time, an alarm may be issued.

As described above, according to the engine control device of this embodiment, when an engine torque becomes excessive relative to a required torque, both the magnitude of an excessive torque Q being an excess of the engine torque and a continuing time T for which the engine torque is excessive are taken into account so that it is possible to properly determine an malfunctioning excessive torque state for which a fail-safe process is necessary. Further, by changing the time threshold value (Tth) of the continuing time T according to the magnitude of the excessive torque Q, a more appropriate determination can be made.

Figure 8:
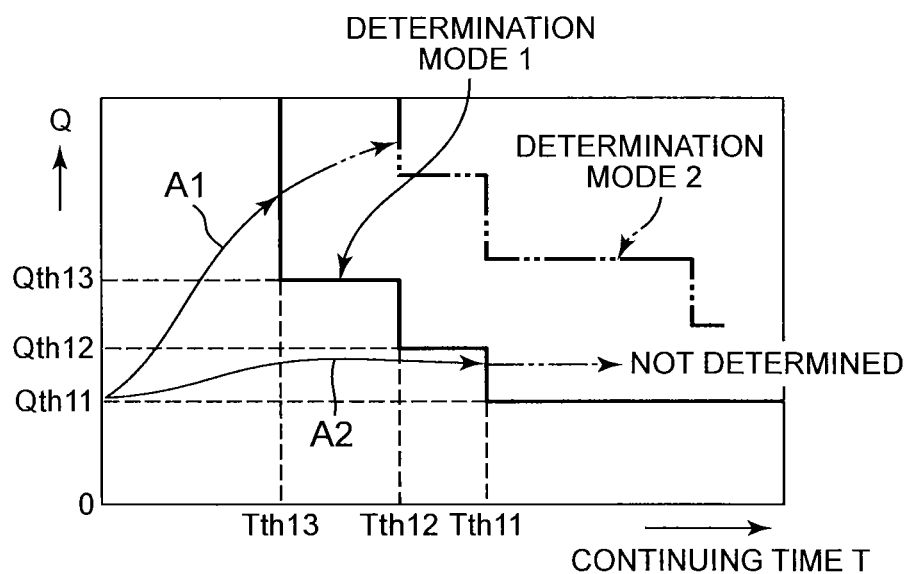
FIG. 8 is an image diagram in which the transition of an excessive torque until reaching a determination of an excessive torque state is shown on the threshold value map of the determination mode 1.

That is, as exemplarily shown in FIG. 8 by way of example, when an excessive torque Q is large in the determination mode 1 (e.g. when it is greater than or equal to the third torque threshold value Qth13), the third time threshold value Tth13, which is short in time, is set. Consequently, as shown by a solid-line arrow A1 in FIG. 8, even when a continuing time T of a state in which an engine torque is excessive is short, it is determined to be an excessive torque state so that a fail-safe process is started promptly.

On the other hand, when an excessive torque Q is small (e.g. when it is less than the second torque threshold value Qth12), the first time threshold value Tth11, which is long in time, is set. Consequently, as shown by a solid-line arrow A2 in FIG. 8, a continuing time T until a determination of an excessive torque state becomes long. Therefore, the chance of the start of a fail-safe process is reduced in the state where the driver hardly feels excessive acceleration, so that it is possible not to give a sense of incongruity to the driver.

In order to change the time threshold value (Tth) according to the magnitude of an excessive torque Q, three torque threshold values (Qth) and corresponding three time threshold values (Tth) are set for each determination mode in this embodiment. Only by measuring a time for which the excessive torque Q is greater than or equal to one of the torque threshold values (Qth) and determining that its continuing time T becomes greater than or equal to one of the time threshold values (Tth), it is possible to determine an excessive torque state and therefore a reduction in the calculation load of the ECU 6 is achieved.

Further, in this embodiment, by selecting the different determination mode according to an accelerator opening degree, when the vehicle speed is high, the torque threshold value (Qth) and the time threshold value (Tth) are changed to greater numerical values. That is, when the accelerator opening degree increases so that the determination mode 2 is selected as shown by a virtual line in FIG. 8, even when the excessive torque Q is large as shown by the arrow A1, since the third time threshold value Tth13 becomes greater, a time until a determination of an excessive torque state becomes longer.

When the excessive torque Q is small as shown by the arrow A2, the first time threshold value Tth11 becomes greater and, in the shown example, the first torque threshold value Qth11 becomes greater so that an excessive torque state is not determined. That is, when the vehicle speed is high, since the inter-vehicle distance to a preceding vehicle is large, the safety is hardly impaired and the driver hardly feels excessive acceleration, and therefore, an allowable excessive torque Q becomes greater and a time for which a torque excessive state is allowed becomes longer.

Therefore, by increasing the torque threshold value (Qth) and the time threshold value (Tth) as described above, it can be suppressed more reliably that a sense of incongruity is given to the driver by the execution of a fail-safe process. In this way, while not giving a sense of incongruity to the driver as much as possible, it is possible to suitably perform the fail-safe process, thereby stably obtaining the effect thereof.

In addition, in this embodiment, since the determination criteria (torque threshold value and time threshold value) for an excessive torque state are changed based on only an accelerator opening degree as described above, the reliability of its determination is not impaired so that the system can be easily guaranteed. This is because the accelerator opening degree sensor 56 is basically of a simple configuration so that malfunction hardly occurs and, further, since signals from the two angle sensors are input to the ECU 6 in parallel, even if one of the angle sensors fails, it is possible to detect an accelerator opening degree.

In the embodiment described above, three determination modes are set basically on the basis of a vehicle speed and, by selecting the determination mode based on an accelerator opening degree as a parameter related to the vehicle speed, the torque threshold value (Qth) and the time threshold value (Tth) are changed. However, the disclosure is not limited thereto and, for example, two determination modes or four or more determination modes may be set.

Further, for example, the determination mode may be selected based on an accelerator opening degree and an engine speed and, when a vehicle speed sensor whose vehicle speed information is guaranteed is mounted on the vehicle, the determination mode may be selected based on an actual vehicle speed detected by the vehicle speed sensor.

Figure 9:
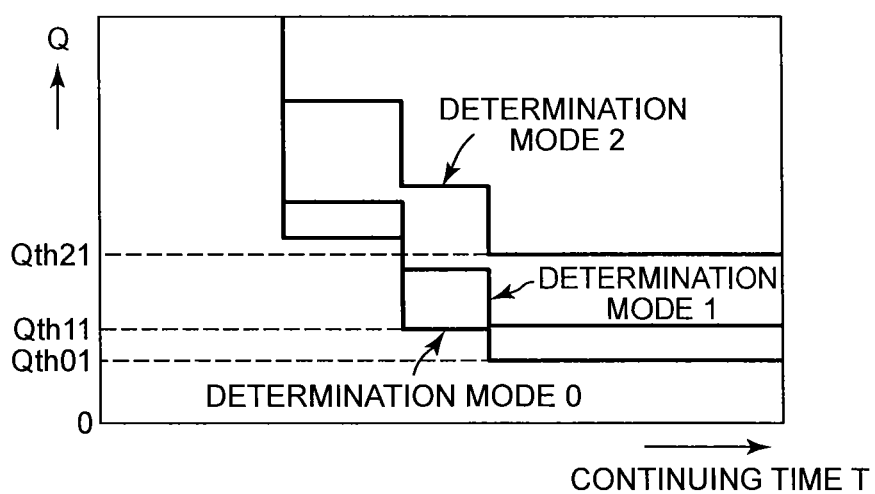
FIG. 9 is a diagram, corresponding to FIG. 3, according to another embodiment in which only torque threshold values are changed.
Figure 10:
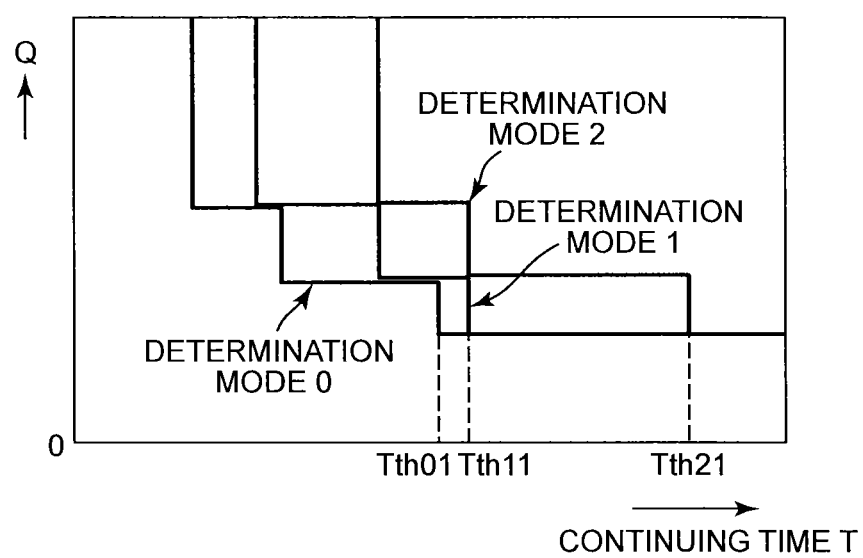
FIG. 10 is a diagram, corresponding to FIG. 3, according to another embodiment in which only time threshold values are changed.

Further, by selecting the determination mode, only one of the torque threshold value (Qth) and the time threshold value (Tth), but not both of them, may be changed. In this case, for example, as shown in FIG. 9, in three determination modes 0 to 2, while torque threshold values (Qth) may be set to be different from each other, time threshold values (Tth) may be set to be the same as each other, or, for example, as shown in FIG. 10, while time threshold values (Tth) may be set to be different from each other, torque threshold values (Qth) may be set to be the same as each other.

Further, the disclosure is not limited to changing the torque threshold value (Qth) and the time threshold value (Tth) by selecting one of the determination modes set as described above. For example, only the torque threshold values (Qth) and the time threshold values (Tth) of the determination mode 1 shown in FIG. 5 may be set in advance and then, the torque threshold value (Qth) may be changed according to an accelerator opening degree using a correction formula or the time threshold value (Tth) may be changed according to an accelerator opening degree using a correction formula.

Further, in the embodiment described above, three torque threshold values (Qth) and three time threshold values (Tth) are set for each determination mode, but the disclosure is not limited thereto. One torque threshold value (Qth) and one time threshold value (Tth) may be set for each determination mode or two or four or more torque threshold values (Qth) and two or four or more time threshold values (Tth) may be set for each determination mode.

The disclosure can suitably perform a fail-safe process by properly determining an engine torque excessive state, without impairing the safety while not giving a sense of incongruity to a driver as much as possible, and its effect is high when applied to a control device for an engine mounted on an automobile.

The invention claimed is:

1. An engine control device fora vehicle including an engine mounted on the vehicle, the engine control device comprising:
an electronic control unit including a memory which stores at least one threshold value map, and which is configured to repeatedly perform a routine during a predetermined time interval, the routine including:
obtaining a required torque for the engine;
obtaining an engine torque;
determining whether the engine is in an excessive torque state, the excessive torque state being a state in which the engine torque is higher than the required torque by at least a predetermined degree; and
performing a fail-safe process when the engine is determined to be in the excessive torque state; wherein
each of the at least one threshold value maps includes a plurality of determination modes including mutually different determination criterion for determining the excessive torque state, based on a predetermined vehicle speed related parameter, the predetermined vehicle speed related parameter being a single parameter or a combination of parameters related to a speed of the vehicle or a change in the speed of the vehicle;

the determining whether the engine is in an excessive torque state includes selecting one of the at least one threshold value maps based on the vehicle speed related parameter, the plurality of determination modes being set such that when a value of the vehicle speed related parameter is a value corresponding to a relatively high vehicle speed, the engine is less prone to be determined to be in the excessive torque state compared to when the value of the vehicle speed related parameter is a value corresponding to a relatively low vehicle speed;

each of the determination criterion for the excessive torque state includes a first threshold value indicating a continuing time of a state in which the engine torque is excessive relative to the required torque;

each of the mutually different determination criterion includes a second threshold value indicating an excess of the engine torque relative to the required torque; and the routine further includes setting the first threshold value by referring to the selected threshold value map, the first threshold value being greater when the vehicle speed related parameter is the value corresponding to the relatively high vehicle speed compared to when the vehicle speed related parameter is the value corresponding to the relatively low vehicle speed, the first threshold value being set based on an expected inter-vehicle distance to a preceding vehicle;

wherein:

the at least one threshold value map stored in the memory includes a first threshold value map and a second threshold value map, the second threshold value for each of the plurality of determination modes of the first threshold value map are set to be equal to each other, and the first threshold value for each of the plurality of determination modes of the second threshold value map are set to be equal to each other.

2. The engine control device according to claim 1, wherein
the vehicle speed related parameter being an accelerator operation amount, and
the electronic control unit is configured to set the determination criterion such that when the accelerator operation amount is relatively large, the engine is less prone to be determined to be in the excessive torque state compared to when the accelerator operation amount is relatively small.

3. The engine control device according to claim 1, wherein
the determination criterion for the excessive torque state includes the second threshold value corresponding to an excess of the engine torque relative to the required torque, and
the electronic control unit is configured to set the second threshold value to be greater when the vehicle speed related parameter is the value indicating the relatively high vehicle speed compared to when the vehicle speed related parameter is the value indicating the relatively low vehicle speed.

4. The engine control device according to claim 1, wherein the fail-safe process includes at least one of restricting engine output and providing an alarm.

5. An engine control method for a vehicle including an engine mounted on the vehicle and an electronic control unit including a memory which stores at least one threshold value map, the engine control method comprising:

obtaining, by the electronic control unit, a required torque for the engine;

obtaining an engine torque by the electronic control unit;

determining, by the electronic control unit, whether the engine is in an excessive torque state, the excessive torque state being a state in which the engine torque is greater than the required torque by at least a predetermined degree; and performing, by the electronic control unit, a fail-safe process when the engine is determined to be in the excessive torque state; wherein the engine control method is performed repeatedly during a predetermined time interval;

each of the at least one threshold value maps includes a plurality of determination modes including mutually different determination criterion for determining the excessive torque state, based on a predetermined vehicle speed related parameter, the predetermined vehicle speed related parameter being a single parameter or a combination of parameters related to a speed of the vehicle or a change in the speed of the vehicle;

the determining whether the engine is in an excessive torque state includes selecting one of the at least one threshold value maps based on the vehicle speed related parameter, the plurality of determination modes being set such that when a value of the vehicle speed related parameter is a value corresponding to a relatively high vehicle speed, the engine is less prone to be determined to be in the excessive torque state compared to when the value of the vehicle speed related parameter is a value corresponding to a relatively low vehicle speed;

each of the determination criterion for the excessive torque state includes a first threshold value indicating a continuing time of a state in which the engine torque is excessive relative to the required torque;

each of the mutually different determination criterion includes a second threshold value indicating an excess of the engine torque relative to the required torque; and the engine control method further comprises setting the first threshold value by referring to the selected threshold value map, the first threshold value being greater when the vehicle speed related parameter is the value corresponding to the relatively high vehicle speed compared to when the vehicle speed related parameter is the value corresponding to the relatively low vehicle speed, the first threshold value being set based on an expected inter-vehicle distance to a preceding vehicles;

wherein:

the at least one threshold value map stored in the memory includes a first threshold value map and a second threshold value map, the second threshold value for each of the plurality of determination modes of the first threshold value map are set to be equal to each other, and the first threshold value for each of the plurality of determination modes of the second threshold value map are set to be equal to each other.

6. The engine control method according to claim 5, wherein
the determination criterion for the excessive torque state includes the second threshold value corresponding to an excess of the engine torque relative to the required torque, and
the second threshold value is set to be greater when the vehicle speed related parameter is the value indicating the relatively high vehicle speed compared to when the vehicle speed related parameter is the value indicating the relatively low vehicle speed.

7. The engine control method according to claim 5, wherein the fail-safe process includes at least one of restricting engine output and providing an alarm.

\* \* \* \* \*